United States Patent Office 3,301,608
Patented Jan. 31, 1967

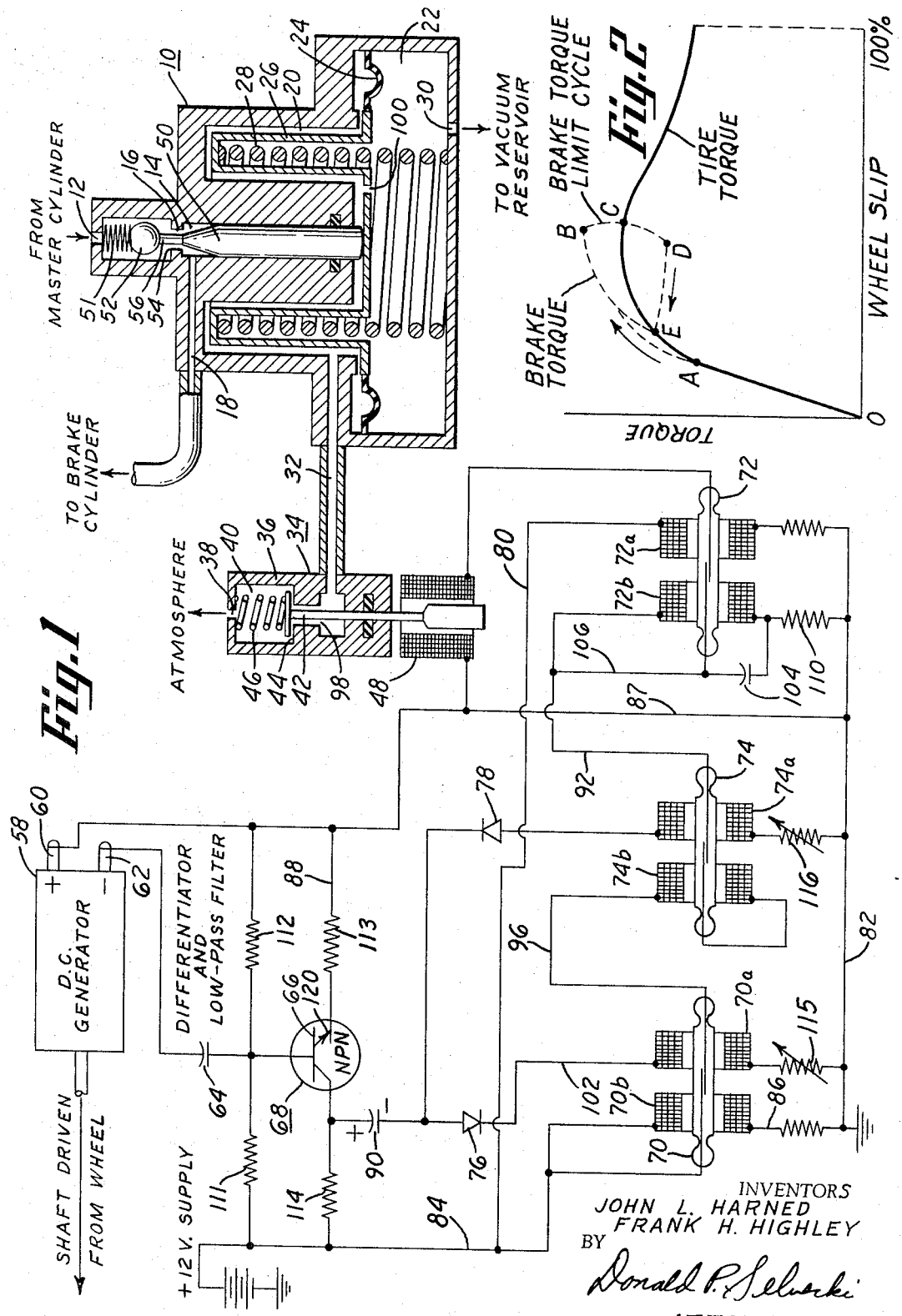

3,301,608
LOGIC CONTROL TYPE ANTI-SKID SYSTEM
John L. Harned, Grosse Pointe Woods, and Frank H. Highley, Franklin, Mich., assignors to General Motors Corporation, Detroit Mich., a corporation of Delaware
Filed Dec. 27, 1965, Ser. No. 516,553
4 Claims. (Cl. 303—21)

This invention relates to vehicle braking mechanisms and more particularly to a brake anti-skid system incorporating logic function and control devices.

On vehicle equipment with hydraulic braking systems, it is usual that selected sets of vehicle wheels are more likely to skid when heavily braked than other sets. This is due primarily to the effective weight shift that takes place during braking. On front engine rear wheel drive vehicles, the effective weight shift during braking is toward the front of the vehicle leaving considerably less weight to be braked by the rear wheels. Therefore less braking is required to rotationally impede the rear wheels and a skid is more likely to ensue in the rear wheels during heavy braking. It is therefore desirable to have a mechanism for sensing the deceleration of a vehicle's rear wheels and translating this information into a braking pressure shut-off function as the vehicle wheel reaches the incipient skid condition. Tests have determined that a brake force must be maintained in the 90% to 95% region in order to guarantee minimum stopping distance during all phases of braking. In addition there is the problem of the change in the wheel slip likelihood when braking is accomplished on a wet surface as compared to a dry surface. In this description, the incipient skid condition is used to describe the situation where a vehicle wheel is on the verge of becoming locked, which condition would be brought about by a slight increase in braking force.

It is an object of the present invention to provide an improved vehicle wheel anti-skid system which directly responds to wheel deceleration.

It is another object of the present invention to provide an improved vehicle wheel anti-skid system which allows the maximum amount of safe braking pressure to be exerted on a vehicle wheel brake before a modulation of the braking force to the affected wheel is accomplished.

It is still another object of the present invention to provide an improved vehicle wheel anti-skid system utilizing a logic function in combination with wheel acceleration and deceleration signals.

It is yet another object of the present invention to provide an improved vehicle wheel anti-skid system which electrically senses a change in the deceleration of a vehicle wheel to actuate electrical apparatus controlling brake pressure shut-off and modulation thereof.

Further objects and advantages of the present invention will be apparent from the following description, reference being had to the accompanying drawings wherein a preferred embodiment of the present invention is clearly shown.

In the drawings:

FIGURE 1 is a sectional view of the hydraulic valving portion of the subject invention shown with a diagrammatic illustration of the electrical circuitry cooperating therewith.

FIGURE 2 is a chart illustrating graphically the function of the subject invention referring to FIGURE 1.

Braking pressure enters housing 10 through inlet 12 from the hydraulic master cylinder. Inlet 12 communicates with control chamber 14 by means of orifice 16. Outlet 18 communicates the braking pressure from inlet 12 to the wheel cylinder. The valve of housing 10 is normally in an open configuration to permit normal vehicle braking. It is understood that a housing 10 can be provided for each vehicle wheel likely to skid or the same housing can be made to service a pluraliy of wheels likely to skid.

Housing 10 is separated into two compartments forming chambers 20 and 22 by means of diaphragm 24 and diaphragm support 26. Spring 28 biases diaphragm support 26 away from chamber 22. Chamber 22 is normally under vacuum through inlet 30 from a vacuum reservoir, typically the engine intake manifold, and chamber 20 has atmospheric pressure selectively communicated to it through inlet 32 from second valve means 34. The second valve means 34 includes a housing 36 which can be integrally formed with housing 10 if desired. Atmospheric air enters inlet 38 and normally maintains atmospheric pressure in chamber 40. Poppet valve 42 is slidable in housing 36 and can be selectively seated on surface 44 of chamber 40. Therefore, inlet 32 can be isolated from chamber 40 by poppet valve 42 moving into engagement with surface 44. Spring 46 bears against the head of poppet valve 42 and normally maintains valve 42 on its seat. Solenoid 48 is energizable in a manner hereinafter described to draw poppet valve 42 off its seat on surface 44 against the bias of spring 46.

Pin 50, slidable in control chamber 14, is translationally moved in diaphragm support 26 against the bias of spring 51 in response to an increase or decrease of pressure in chamber 20. Ball 52 is a separate element controlled by pin 50 and is adapted to move into seat 54 as pin 50 moves toward chamber 22 to cut off braking pressure communication between inlet 12 and outlet 18. Pin 50 is movable in control chamber 14 as pressure in chamber 20 exceeds the compressive force of spring 28 thereby enlarging the volume in control chamber 14 to reduce braking pressure in a manner to be hereinafter described. The valving mechanism and associated apparatus disposed in housing 10 is sometimes referred to herein as first valve means.

Solenoid 48 is controlled in operation by a logic control means illustrated in the drawing diagrammatically in a circuit diagram. D.C. tachometer generator 58 is engaged with a vehicle wheel, as indicated, to produce a voltage proportional to wheel speed. The generator 58 has a negative output terminal 62 and a positive output terminal 60. A resistor 112 and a capacitor 64 are connected between terminals 60 and 62. The positive side of capacitor 64, as charged by generator 58, is connected to the base of transistor 68. Transistor 68 is a typical NPN type transistor requiring the base to be positively biased with respect to the emitter 120 in order to make the transistor conductive. Transistor 68 is normally in Class A operation or partially conducting due to the resistance network of resistors 111, 112, 113 and 114 and capacitor 64. RC differentiating circuit, comprising capacitor 64 and resistors 112 and 113, is connected between tachometer generator 58 and transistor 68 such that the voltage applied to the transistor is proportional to wheel acceleration, i.e., the change in angular velocity. The voltage at base 66 of transistor 68 varies about a quiescent bias level in a manner proportional to wheel deceleration and acceleration. In short the base voltage increases when the wheel decelerates and decreases when the wheel accelerates.

A twelve volt power supply imposes a normally twelve volt potential on the circuit shown and maintains reed switch 70 and reed switch 72 in a normal closed condition. Reed switch 74 is normally maintained in an open condition during normal braking. When reed switches 7, 72 and 74 are in a closed condition simultaneously, solenoid 48 is energized to reposition poppet valve 42 setting the anti-skid system into operation.

Diode 76 blocks a deceleration signal from coil 70a of reed switch 70 and diode 78 blocks the acceleration signal from coil 74a of reed switch 74. Coil 72a of reed switch 72 is constantly energized through lead 80 with lead 82 to ground. Coil 70b of reed switch 70 is constantly energized through lead 84, coil 70b being grounded through lead 86. Coil 70a, coil 74a, 74b and coil 72b are normally not energized.

In operation, it will be initially assumed that the vehicle on which the subject invention is mounted is moving with the brakes not energized. Under these operating conditions, braking pressure is freely communicated from inlet 12 to outlet 18, poppet valve 42 is seated on surface 44, reed switches 70 and 72 are in a closed condition, and reed switch 74 is in an open condition. During the aforementioned condition of operation, normal and equal braking capability is had when all of the vehicle wheel brakes are energized and the subject system is not operative to control braking pressure.

It will now be assumed that the vehicle brakes are applied and rapid deceleration of the vehicle takes place.

Referring to FIGURE 2, the brake torque and tire torque increase at a rate proportional to wheel slip until point A on the graph is reached. At point A brake torque continues to increase toward point B while the tire torque curve levels off toward point C. It is clear that the tire is rapidly advancing toward 100% wheel slip as this occurs and the incipient skid condition is encountered.

The deceleration of the vehicle wheels whose braking pressure is being controlled is monitored by the generator 58 and the RC differentiating circuit. The output of generator 58 varies proportionally as wheel lock-up is approached. Solenoid 48 must be energized before second valve means 34 is operated and this is brought about in the following manner: When D.C. generator 58 is running at constant speed, capacitor 64 is in a charged condition and resistor 113 biases emitter 120 more positively than the base 66 so that the transistor 68 is only partially conductive. Coil 74a is not energized because the path for current flow thereto through lead 87 and 88 from the voltage supply is partially blocked by transistor 68. As long as D.C. generator 58 puts out a signal of sufficient magnitude to maintain capacitor 64 charged, transistor 68 remains in partial conduction and coil 74a remains unenergized. When the vehicle wheel being controlled decelerates markedly due to heavy braking, the output from the generator 58 is lowered proportionally. When the output reaches a sufficiently decreased level, at Point B determined by variable resistor 116, capacitor 64 discharges through generator 58 to ground thereby making the polarity of the potential at base 66 more positive than the emitter 120. Transistor 68 saturates and provides a path for current flow to coil 74a in the following manner. Capacitor 90 normally positively charged through resistor 114 from the power supply is more positive than ground and discharges through transistor 68 as the transistor goes completely conductive. Current then flows from ground through coil 74a and diode 78 to equalize the charge on capacitor 90 to momentarily energize coil 74a. Coil 74a closes reed switch 74 providing a path for current flow through coil 74b from the 12 volt power supply through normally closed reed switch 70, leads 96 and 92, and normally closed reed switch 72. Coil 74b thereby takes over and maintains reed switch 74 in a closed condition. Current is then provided from the power supply through the closed reed switches 70, 72 and 74 to solenoid 48 causing an energization thereof.

With the energization of solenoid 48, point B on the graph in FIGURE 2 is reached and poppet valve 42 is opened against the bias of spring 46 admitting atmospheric pressure into inlet 32 and ultimately the chamber 20. This pressure build-up behind diaphragm 24 and diaphragm support 26 causes a movement of diaphragm support 26 against the bias of spring 28. Pin 50 follows the movement of diaphragm support 26 allowing valve 52 to contact the seat 54. This cuts off braking pressure between inlet 12 and outlet 18. No further braking pressure is communicated to the vehicle brakes now at the incipient skid condition and further build-up of pressure in chamber 20 results in further movement of pin 50 so that control chamber 14 becomes enlarged resulting in the decreasing of the braking pressure trapped between valve 52 and the brakes. Thus brake torque decreases rapidly from point B to point C. Wheel slip remains relatively constant during this period with the wheel accelerating from point C to point D as brake torque is decreased and wheel acceleration increases. At point D wheel slip is decreased toward point E where a new cycle is started.

Reed switch 74 remains in a closed condition as long as current flow is maintained through transistor 68 which, as previously stated, must be biased by a positive polarity at base 66 to be conductive. When the braking pressure in the controlled wheels is cut off, the deceleration rate decreases and an increasing voltage is generated by D.C. generator 58 as it is speeded up. When a higher voltage is again generated by generator 58, capacitor 64 charges through resistors 112 and 113 which lowers the voltage at the base 66 of transistor 68 which causes transistor 68 to approach a cut-off condition. This phase of operation is graphically illustrated at point D on the graph in FIGURE 2.

As the foregoing occurs, capacitor 90 charges through diode 76 through lead 102 to coil 70a causing reed switch 70 to momentarily open which deenergizes solenoid 48 resulting in spring 46 driving poppet valve 42 to its seat on surface 44. Atmospheric pressure in chamber 20 is bled through orifice 100 to the vacuum reservoir and spring 28 drives diaphragm 24 toward inlet 12. Movement of pin 50 increases pressure to the brakes. Valve 52 is picked up by pin 50 and unseated against the bias of spring 51 thereby restoring normal braking pressure communication between inlet 12 and outlet 18. When reed switch 70 momentarily opens during the charging of capacitor 90, coil 74b is deenergized resulting in reed switch 74 returning to its normal open position. When capacitor 90 is charged, coil 70b becomes dominant relative to coil 70a resulting in reed switch 70 returning to its normally closed position. Reed switch 72 remains in a closed condition because the power supply through lead 80 has not been affected during the aforementioned cycle and the system is again ready for cycling when point E on the graph is reached in FIGURE 2.

The subject system has the added feature of a fail-safe interlock that is controlled by reed switch 72 in conjunction with a network formed by coil 72b and capacitor 104. If a malfunction occurs in reed switches 74 or 70 when they are in a closed condition, braking pressure to the controlled wheels would ordinarily remain cut off. The subject invention incorporates a method of preventing this occurrence. If reed switch 74, in series with switch 72, remains energized for an abnormal period of time, capacitor 104 will become charged through leads 106 and register 110. This time delay circuit results in energization of coil 72b due to a potential increase thereacross as capacitor 104 becomes fully charged. Coil 72b opens reed switch 72 in the same manner as reed switch 70 which in turn breaks the circuit to solenoid 48 resulting in the normal repositioning of poppet valve 42 to the closed position. Due to the fact that reed switch 72 does not operate when the remainder of the brake control is functioning properly, it is possible to establish a satisfactory high confidence level that reed switch 72 will operate when needed. It is understood that the fail-safe interlock functions only when reed switches 70 or 74 malfunction.

In summary, the subject invention acts to shut off braking pressure and to decrease trapped braked pressure as vehicle wheels start to slip and an incipient skid condition is encountered. The structure illustrated in FIGURE 1 operates in a manner graphically shown in FIGURE 2 to accomplish this. To illustrate, as brakes are applied brake torque, the force against the brake shoes, and tire torque, the force the tire exerts against the road surface, increase together until a point is reached where brake torque continues to increase at a given rate, but tire torque does not. The tire torque curve trails because the tires are beginning to slip on the road surface. This point is denoted as point A on the graph of FIGURE 2. The significant portion of the graph begins here.

As brake torque advances past point A toward point B, tire torque tapers off and the wheels begin slipping at a greater rate. It should be noted that a certain amount of slip can be tolerated. At 100% slip the tire torque trails off badly relative to brake torque as the wheels are locked at this point. Therefore, this point must be anticipated.

The D.C. generator and differentiating circuit puts out a voltage that is proportional to wheel acceleration or conversely viewed, wheel deceleration. During steady state operation or when low rate changes in generator output occur the charging of capacitor 64 is such that transistor 68 is maintained in Class A operation and no system operation is had. But when a sudden change in the output of generator 58 is experienced, as when a tire torque decreases during brake torque increase, a wheel is slipping on the road surface and a skid is imminent. This wheel deceleration is sensed as a change in output of generator 58 allowing transistor 68 to go fully conductive. This is designed to occur at point B on the graph. As previously described, as the transistor conducts near the saturated state, capacitor 90 is discharged through reed switch 74 causing solenoid 48 to start brake pressure shut off. This is illustrated on the graph as the drop in brake torque from point B toward point D. The percent of wheel slip remains relatively stable through point C where tire torque curve is intersected.

At point D brake torque and tire torque remain relatively stable, but wheel slip decreases to an acceptable level at point E. The wheel accelerates during this period and the output of the generator 58 increases to achieve steady state operation of the system as previously described. When point E is reached on the graph with the brakes still applied the cycle repeats until the generator output variance is insufficient to make the system respond. Braking stability is reached under these conditions. The cycling rate can be as high as 10 cycles per second but is controllable to any desired rate by varying resistors 115 and 116 to achieve desired parameters.

The subject anti-skid system finds particular utility in a vehicle braking system when an incipient skid condition arises due to effective weight shift of vehicle weight during maximum braking conditions. The logic function of the system along with the low pass filter and differentiator function allows the output of D.C. generator to be translated into a working voltage for solenoid 48 when the need for brake pressure cut-off arises. It should be noted that the response rate of the subject device can be easily controlled by the size of orifice 98 and the size of orifice 100. The actual response point of the deceleration signal of the D.C. generator can be controlled by the valuation of transistor 68 as well as by varying resistors 115 and 116. The particular system can be made more or less sensitive in a given installation when the effective weight shift to be expected varies from an established norm.

While the embodiments of the present invention as herein disclosed constitute a preferred form, it is to be understood that other forms might be adopted.

What is claimed is as follows:

1. In combination: a closed loop anti-skid system comprising valve means adapted for connection between a master cylinder and a vehicle wheel brake motor, the valve means having a normally open configuration;
   electrical current responsive control means operatively connected to the valve means for closing the valve means upon receipt of current;
   a voltage generator drivably engageable with the vehicle wheel for producing a voltage proportional to the angular velocity thereof;
   circuit means for differentiating said voltage thereby to produce deceleration and acceleration voltages in accordance with the respective changes in the velocity of said wheel;
   signal generating means connected to the circuit means for producing respective signals of first and second polarities in response to the deceleration and acceleration signals respectively;
   a first normally open-circuit switch having a control input connected to receive the signal of first polarity and to close the switch in response thereto;
   a second normally closed-circuit switch having a control input connected to receive the signal of second polarity and to open the switch in response thereto;
   a current supply;
   and conductor means connecting the supply in a series circuit with the first and second switches and the control means, whereby the valve means is urged toward a closed configuration whenever the wheel decelerates at a predetermined rate and toward an open configuration whenever the wheel accelerates.

2. The combination defined in claim 1 further comprising a third normally closed switch connected into said series circuit and including means responsive to the time-integral of electric current therethrough to open circuit the third switch.

3. The combination defined in claim 1 wherein the valve means includes a fluid inlet, a fluid outlet, a pressure control chamber mediate the inlet and outlet, a displaceable member disposed in the chamber for regulating the volume thereof, the member being displaceable upon energization of the said control means to enlarge said chamber.

4. The combination defined in claim 1 wherein the first switch includes a holding circuit for maintaining the closed condition following cessation of said 1st signal.

References Cited by the Examiner

UNITED STATES PATENTS

| 3,017,145 | 1/1962 | Yarber | 303—21 |
| 3,037,085 | 6/1962 | Lowry | 200—87 |
| 3,223,459 | 12/1965 | Packer | 303—21 |

EUGENE G. BOTZ, *Primary Examiner.*